United States Patent
Chiou et al.

(10) Patent No.: US 11,029,227 B2
(45) Date of Patent: Jun. 8, 2021

(54) CSOI MEMS PRESSURE SENSING ELEMENT WITH STRESS EQUALIZERS

(71) Applicant: Continental Automotive Systems, Inc., Auburn Hills, MI (US)

(72) Inventors: Jen-Huang Albert Chiou, Libertyville, IL (US); Shiuh-Hui Steven Chen, Lake Zurich, IL (US)

(73) Assignee: Vitesco Technologies USA, LLC, Auburn Hills, MI (US)

( * ) Notice: Subject to any disclaimer, the term of this patent is extended or adjusted under 35 U.S.C. 154(b) by 85 days.

(21) Appl. No.: 16/123,367

(22) Filed: Sep. 6, 2018

(65) Prior Publication Data

US 2019/0368956 A1 Dec. 5, 2019

Related U.S. Application Data

(60) Provisional application No. 62/680,326, filed on Jun. 4, 2018.

(51) Int. Cl.
*G01L 9/00* (2006.01)
*G01L 9/06* (2006.01)

(52) U.S. Cl.
CPC .......... *G01L 9/0054* (2013.01); *G01L 9/0042* (2013.01); *G01L 9/06* (2013.01)

(58) Field of Classification Search
CPC ..... G01L 9/0052; G01L 9/008; G01L 9/0042; G01L 9/0045; G01L 9/0054; G01L 9/06; G01B 7/16
See application file for complete search history.

(56) References Cited

U.S. PATENT DOCUMENTS

| 6,184,561 B1 * | 2/2001 | Tanaka ................. G01L 9/0054 257/417 |
| 6,528,340 B2 * | 3/2003 | Haji-Sheikh .......... G01L 9/0042 438/53 |
| 7,111,518 B1 | 9/2006 | Allen et al. |

(Continued)

FOREIGN PATENT DOCUMENTS

CN 101371357 A 2/2009

OTHER PUBLICATIONS

T. Waber et al.; "Temperature characterization of flip-chip packaged piezoresistive barometric pressure sensors" Technical Paper, Microsyst Technol, Published online Jan. 10, 2014, pp. 861-867; DOI 10.1007/s00542-013-2064-9.

(Continued)

*Primary Examiner* — Francis C Gray

(57) ABSTRACT

A pressure sensing element includes a supporting substrate including a cavity. A device layer is bonded to the supporting substrate, with a diaphragm of the device layer covering the cavity in a sealed manner. A plurality of piezoresistors is coupled to the diaphragm. A plurality of metal stress equalizers is disposed on the device layer such that each stress equalizer is generally adjacent to, but separated from, a corresponding piezoresistor. A plurality of metal bond pads is disposed on the device layer. The plurality of stress equalizers are constructed and arranged to reduce thermal hysteresis of the pressure sensing element caused by stress relaxation of the metal bond pads during a cooling and heating cycle of the pressure sensing element.

19 Claims, 6 Drawing Sheets

(56) References Cited

U.S. PATENT DOCUMENTS

| | | | | |
|---|---|---|---|---|
| 7,562,582 B2* | 7/2009 | Yoshikawa | ............ | G01L 9/0055 |
| | | | | 73/777 |
| 8,338,967 B2 | 12/2012 | Hochstenbach | | |
| 8,714,021 B2* | 5/2014 | Gamage | ................ | G01L 9/0054 |
| | | | | 73/721 |
| 8,833,172 B2* | 9/2014 | Chiou | ................... | G01L 9/0054 |
| | | | | 73/708 |
| 9,176,018 B2* | 11/2015 | Qi | ......................... | G01L 9/0042 |
| 9,557,237 B2 | 1/2017 | McNeal et al. | | |
| 9,804,046 B2* | 10/2017 | Kwa | ....................... | H01L 41/27 |
| 10,221,062 B2* | 3/2019 | Chiou | ..................... | G01L 9/005 |
| 2009/0159997 A1* | 6/2009 | Okudo | ................. | G01P 15/125 |
| | | | | 257/415 |
| 2015/0135853 A1* | 5/2015 | McNeal | .................... | G01F 1/76 |
| | | | | 73/861.351 |

OTHER PUBLICATIONS

J.A. Chiou et al.; "Thermal Hysteresis of MEMS Pressure Sensors", IEEE/ASME, Journal of Microelectromechanical Systems, Aug. 2005, vol. 14, pp. 782-787.

MT Microsystems, Co., Ltd.; "MEMS Pressure Sensor Dies", 2015, Shanghai, China.

Robert Bosch GMBH; "Barometric pressure sensor for engine management systems SMP480", Automotive Electronics, 2012, www.bosch.de.

\* cited by examiner

CSOI MEMS PRESSURE SENSING ELEMENT WITH STRESS EQUALIZERS

This application claims the benefit of U.S. Provisional Application No. 62/680,326 filed on Jun. 4, 2018, the contents of which is hereby incorporated by reference into this specification.

FIELD OF THE INVENTION

The invention relates generally to a pressure sensing element which includes at least one stress equalizer to minimize the thermal-mechanical effect of wire bond pad metallization, and thus minimize thermal hysteresis.

BACKGROUND OF THE INVENTION

Microelectromechanical system (MEMS) pressure sensing elements are generally known and widely used. Cavity silicon-on-insulator (C-SOI) wafers are a cutting edge SOI technology where the handle wafer (or supporting wafer) contains pre-etched cavities. One type of cavity silicon-on-insulator (CSOI) MEMS pressure sensing element is an absolute pressure sensing element which includes a silicon device layer fusion-bonded onto a silicon supporting substrate containing a pre-etched cavity to form a reference vacuum in the cavity. The pressure sensing element includes four piezoresistors connected into what is known as a "Wheatstone Bridge" configuration. The piezoresistors are doped on a diaphragm disposed over the cavity so as to detect deflection of the diaphragm due to pressure changes.

These MEMS pressure sensing elements are manufactured in different sizes and used for various applications. However, wire bond pad metallization in reduced size MEMS pressure sensing elements results in thermal hysteresis, which cannot be calibrated.

With reference to the hysteresis loop shown in FIG. 1, during the thermal cooling and heating process of a reduced size MEMS pressure sensing element, the voltage output is not maintained. The output voltage is measured at an initial point ($V_I$) at room temperature around 22° C. The temperature of the MEMS pressure sensing element is then decreased to −40° C., and then increased back to 22° C. and the voltage output at this mid-point ($V_M$) is measured and is higher than the output voltage at the initial point ($V_I$). The temperature of the MEMS pressure sensing element is then increased to 150° C. and then decreased back to the room temperature and the output voltage of the MEMS pressure sensing element is measured at this final point (($V_F$). The cold hysteresis voltage=$V_M-V_I$. The hot hysteresis voltage=$V_F-V_I$. The worst voltage difference=$V_F-V_M$ is considered herewith as the thermal hysteresis voltage. The thermal hysteresis is defined as the thermal hysteresis voltage divided by the span and expressed in %. There are instances where the thermal hysteresis is too high, and the MEMS pressure sensing element may not be calibrated.

The root cause of thermal hysteresis of the MEMS pressure sensing element is due to the aluminum stress relaxation (viscoplasticity) in the cooling and heating process of the aluminum bond pads deposited on silicon. The biaxial aluminum stress is unable to return to the original residual stress state. The thermal residual stress difference causes the output voltage shift, referred to as the "thermal hysteresis voltage."

Accordingly, there exists a need for a reduction or elimination of thermal hysteresis in a MEMS pressure sensing element having such bond pads.

SUMMARY OF THE INVENTION

An object of an embodiment is to fulfill the need referred to above. In accordance with the principles of an embodiment, this objective is obtained by providing a pressure sensing element including a supporting substrate having a cavity. A device layer is bonded to the supporting substrate, with a diaphragm of the device layer covering the cavity in a sealed manner. A plurality of piezoresistors is coupled to the diaphragm. A plurality of metal stress equalizers is disposed on the device layer such that each stress equalizer is generally adjacent to, but separated from, a corresponding piezoresistor. A plurality of metal bond pads is disposed on the device layer. The plurality of stress equalizers are constructed and arranged to reduce thermal hysteresis of the pressure sensing element caused by stress relaxation of the metal bond pads during a cooling and heating cycle of the pressure sensing element.

In accordance with another aspect of an embodiment, a method of controlling thermal hysteresis of a pressure sensing element provides a MEMS pressure sensing element having a supporting substrate including a cavity. A device layer is bonded to the supporting substrate, with a diaphragm of the device layer covering the cavity in a sealed manner. A plurality of piezoresistors is coupled to the diaphragm, and a plurality of metal bond pads is disposed on the device layer. The method controls thermal hysteresis of the pressure sensing element caused by stress relaxation of the metal bond pads during a heating and cooling cycle by increasing radial stress and decreasing tangential stress on each of the plurality of piezoresistors on the pressure sensing element.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
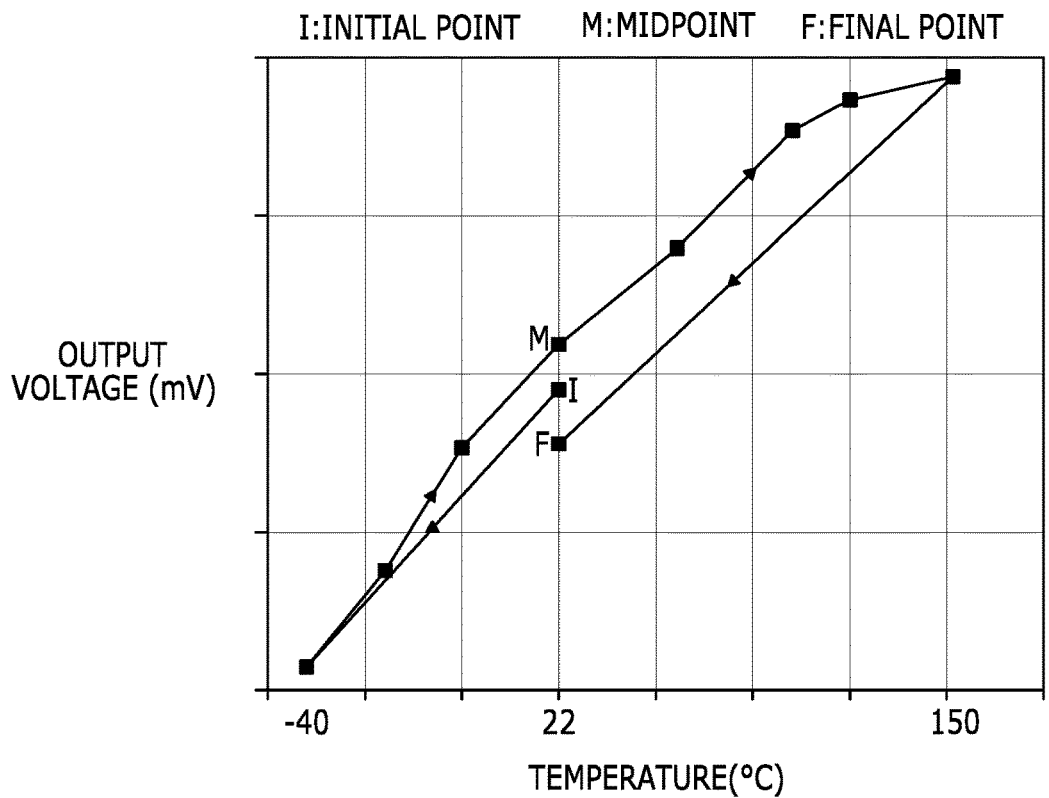
FIG. 1 is a thermal hysteresis loop of a MEMS pressure sensing element.

The following description of the preferred embodiment(s) is merely exemplary in nature and is in no way intended to limit the invention, its application, or uses.

A MEMS pressure sensor includes a MEMS pressure sensing element and an ASIC encapsulated and protected by a housing. An example of the MEMS pressure sensing element according to an embodiment of the present invention is shown in FIGS. 2-5, generally at 10. The MEMS pressure sensing element 10 includes a device layer, generally indicated at 12, a supporting silicon substrate 14, and a buried oxide layer 16. A recess or cavity, generally at 18, is defined in the supporting substrate 14. The device layer 12 is attached to the supporting substrate 14 such that a diaphragm 19 of the device layer 12 covers the cavity 18 in a sealed manner to define a vacuum cavity under a diaphragm 19. A plurality of piezoresistors 20 is doped and a plurality of bond pads 22 is deposited or otherwise coupled to the device layer 12. The bond pads 22 are metal and preferably aluminum. The piezoresistors 20 are arranged in the standard distributed Wheatstone Bridge arrangement on the diaphragm 19 and near a circumferential edge 21 thereof so as to sense stresses upon deflection of the diaphragm 19.

Figure 2:
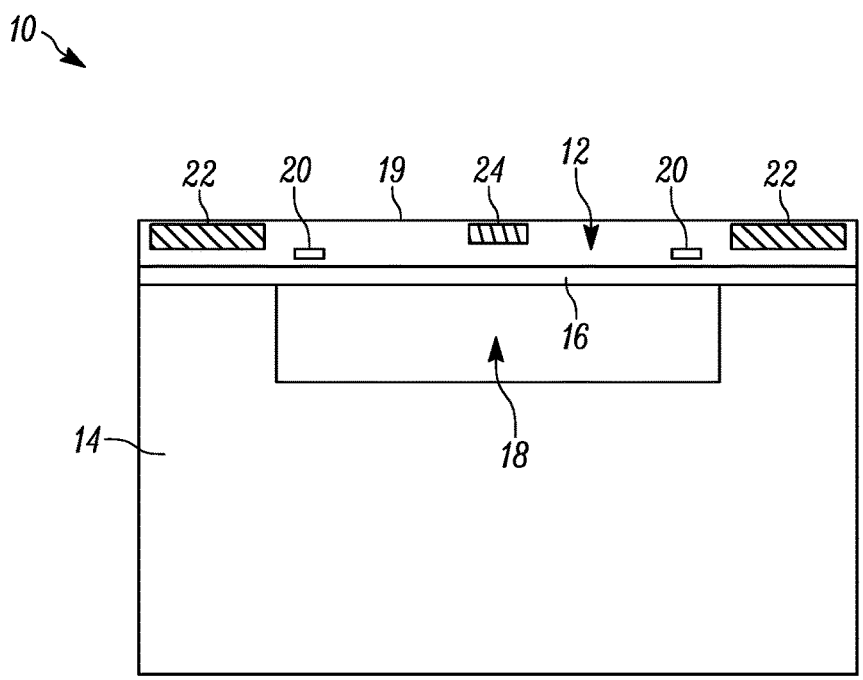
FIG. 2 is a schematic sectional side view of a pressure sensing element having stress equalizers according to an embodiment of the present invention.
Figure 3:
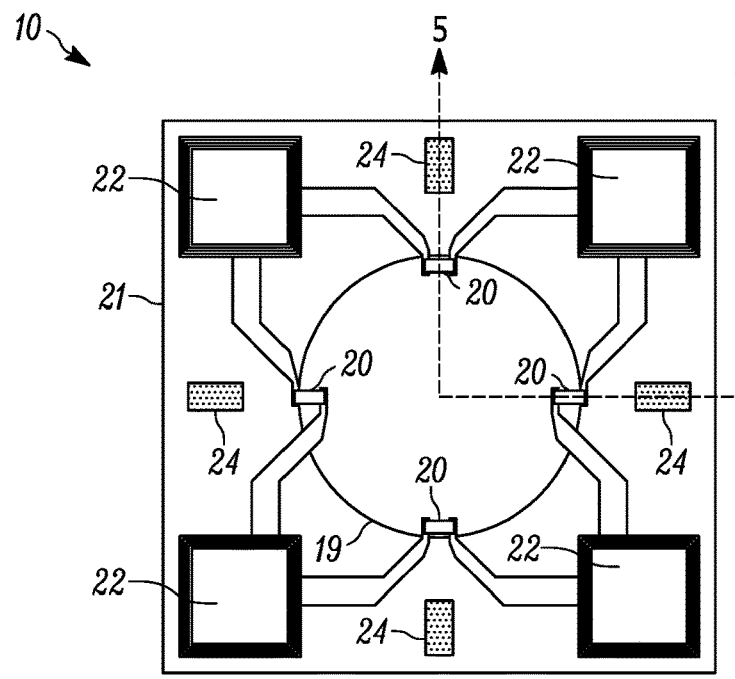
FIG. 3 is a top view of a pressure sensing element of FIG. 2.
Figure 4:
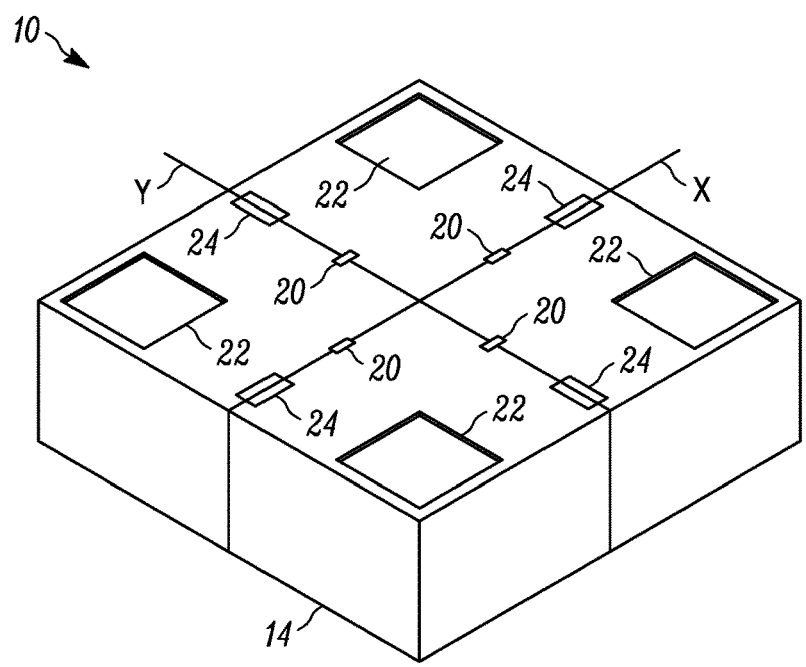
FIG. 4 is a perspective view of a pressure sensing element of FIG. 2.

In accordance with the embodiment, as shown in FIGS. 2-4, plurality of stress equalizers 24 are provided on the upper surface of the device layer 12. Each stress equalizer 24 is a metal member, separated from, but of the same metal as the bond pads (e.g., aluminum). As shown in FIG. 3, four stress equalizers 24 are provided with one stress equalizer 24 disposed generally adjacent to, but separated from, a respective piezoresistor 20. In the embodiment, two piezoresistors 20 and two corresponding stress equalizers 24 are disposed on a first axis X and the other two piezoresistors 20 and two corresponding stress equalizers 24 are disposed on a second axis Y that is perpendicular to the axis X. The stress equalizers 24 are thus generally symmetrically located outside the circumferential edge 21 of diaphragm 19. The stress equalizers 24 increase radial stresses and reduce tangential stresses on the piezoresistors 20, such that thermal hysteresis is reduced as will be explained further below.

Figure 6A:
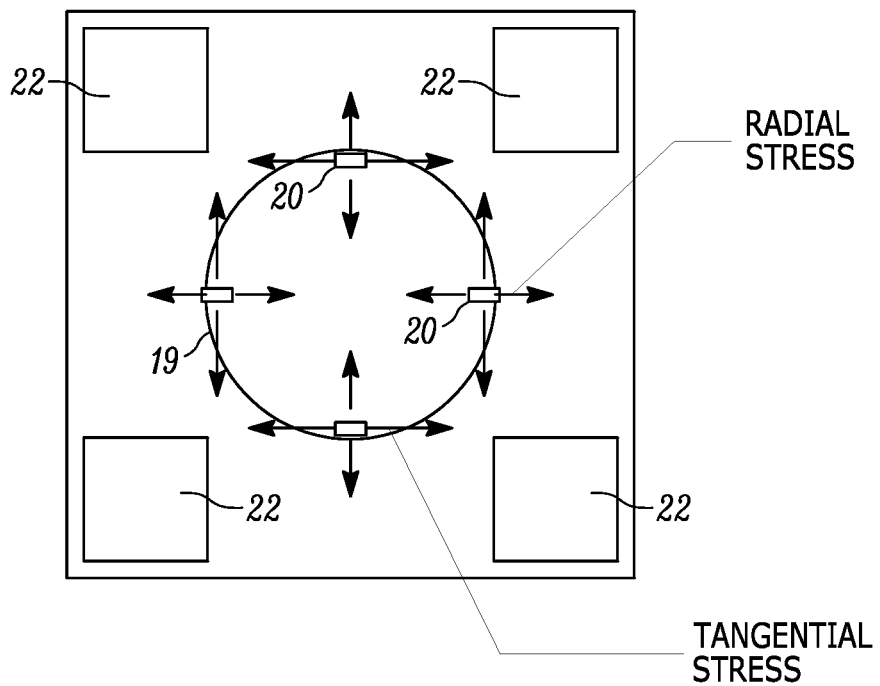
FIG. 6A is a top view of a pressure sensing element without stress equalizers, showing radial and tangential stresses at a mid-point M of the thermal hysteresis loop in FIG. 1.
Figure 6B:
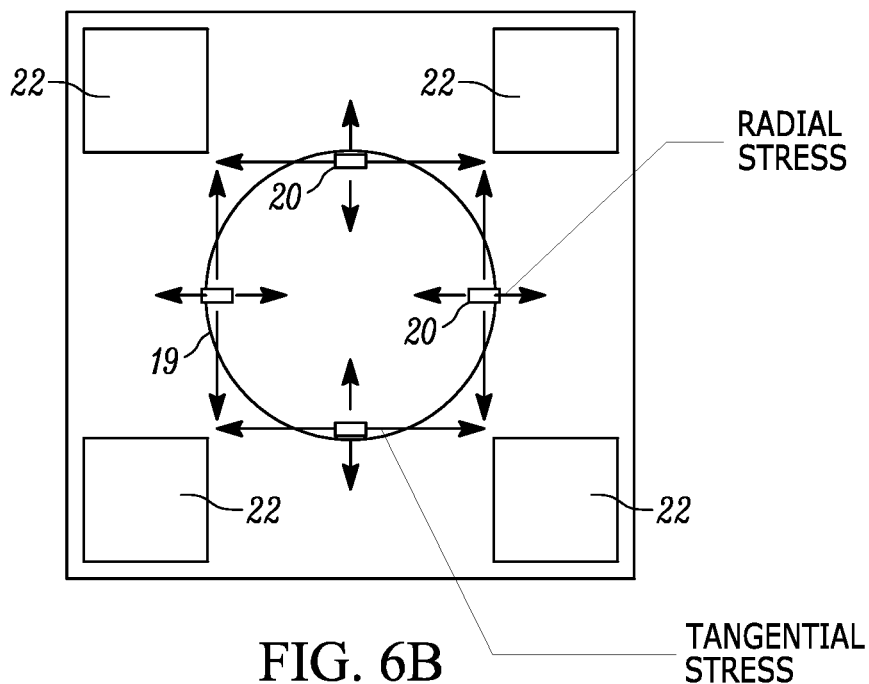
FIG. 6B is a top view of a pressure sensing element without stress equalizers, showing radial and tangential stresses at a final point F of the thermal hysteresis loop of FIG. 1.

The function of the stress equalizers 24 will be appreciated with regard to FIGS. 6A, 6B, 7A, and 7B. FIG. 6A is a top view of a pressure sensing element without the stress equalizers 24 and shows radial and tangential stresses on the piezoresistor 20 at a mid-point M of the thermal hysteresis loop in FIG. 1. As the tangential stress on the piezoresistor 20 is greater than the radial stress on the piezoresistor 20 due to the thermal residual stress on the metal bond pads 22 resulted from the cold cycle, a negative output voltage of the MEMS pressure sensing element $V_M$ is caused at the mid-point M in FIG. 1. FIG. 6B is a top view of a pressure sensing element without the stress equalizers 24 and shows radial and tangential stresses at the final point F of the thermal hysteresis loop of FIG. 1. As shown, the tangential stress on the piezoresistor 20 is further greater than the radial stress on the piezoresistor 20 due to a higher thermal residual stress on the metal bond pads 22 resulted from the hot cycle causing a further negative output voltage of the pressure sensing element $V_F$ at the final point F. Such negative output voltages cause a negative thermal hysteresis ($V_F-V_M$) due to different thermal residual stresses on the wire bond pad 22 metalization.

Figure 7A:
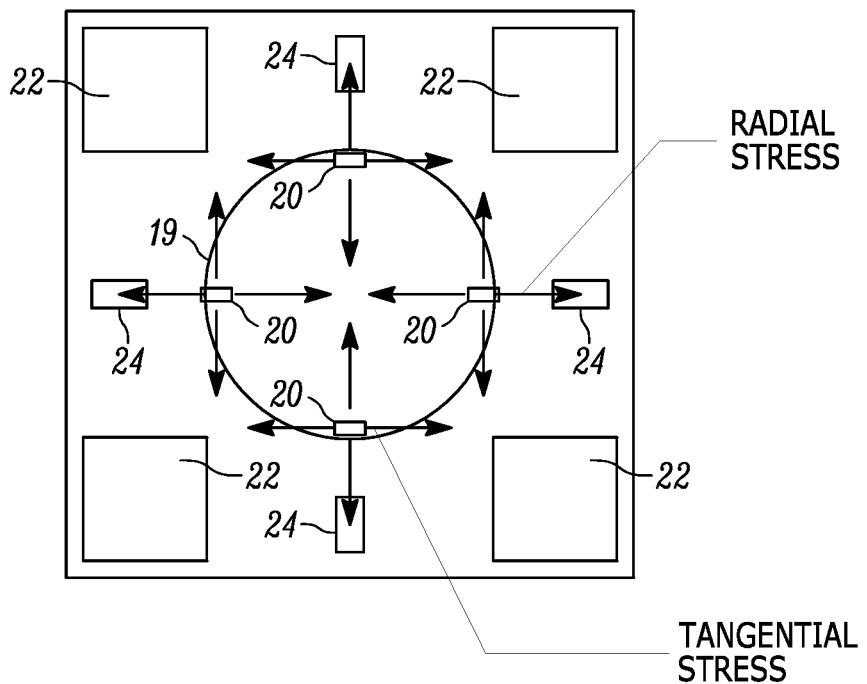
FIG. 7A is a top view of the pressure sensing element of FIG. 4 having stress equalizers of the embodiment, showing radial and tangential stresses at a mid-point M of the thermal hysteresis loop in FIG. 1.
Figure 7B:
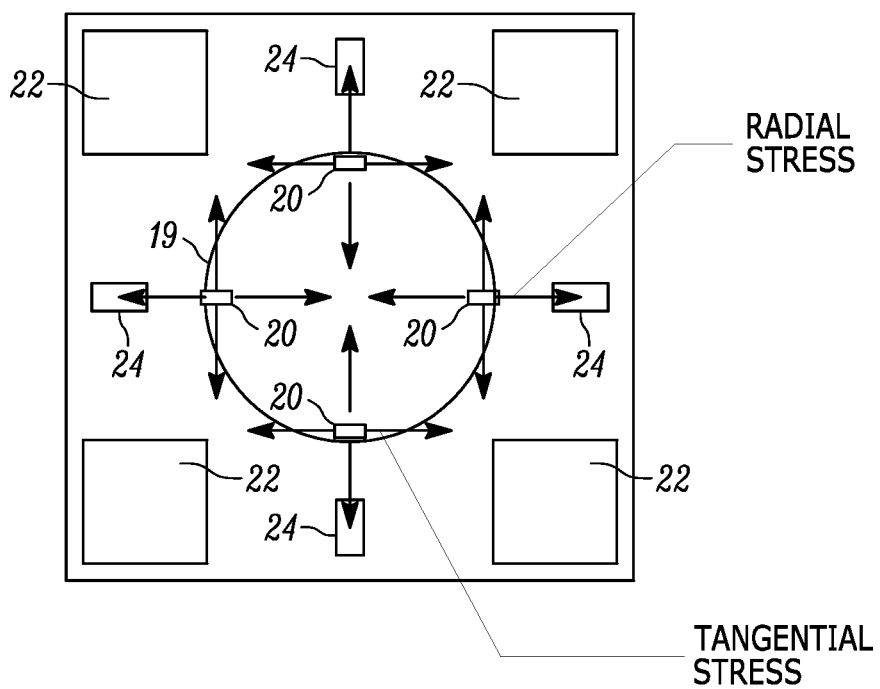
FIG. 7B is a top view of the pressure sensing element of FIG. 4 having stress equalizers of the embodiment, showing radial and tangential stresses at a final point F of the thermal hysteresis loop of FIG. 1.

FIG. 7A is a top view of the MEMS pressure sensing element 10 with the stress equalizers 24 and shows radial and tangential stresses on the piezoresistor 20 at a mid-point M of the thermal hysteresis loop of FIG. 1. As shown, the radial stress on the piezoresistor 20 is increased while the tangential stress is reduced due to the thermal residual stress on the stress equalizer 24 near the corresponding piezoresistor 20, the negative voltage output $V_F$ at the mid-point M is therefore reduced and moves toward zero or small output voltage. FIG. 7B is a top view of the pressure sensing element 10 with the stress equalizers 24 and shows radial and tangential stresses on the piezoresistor 20 at the final point F of the thermal hysteresis loop of FIG. 1. As shown, the magnitude of radial stress on the piezoresistor 20 is again closer to the magnitude of the tangential stress on the piezoresistor 20 causing a small output voltage $V_F$ at the final point F. A smaller thermal hysteresis ($V_F-V_M$) can then be reached. The change of the negative output voltages toward much smaller values due to the stress equalizers 24 improves the thermal hysteresis of the MEMS pressure sensing element 10 even though to the MEMS pressure sensing element 10 still has the wire bond pad 22 metalization.

Figure 5:
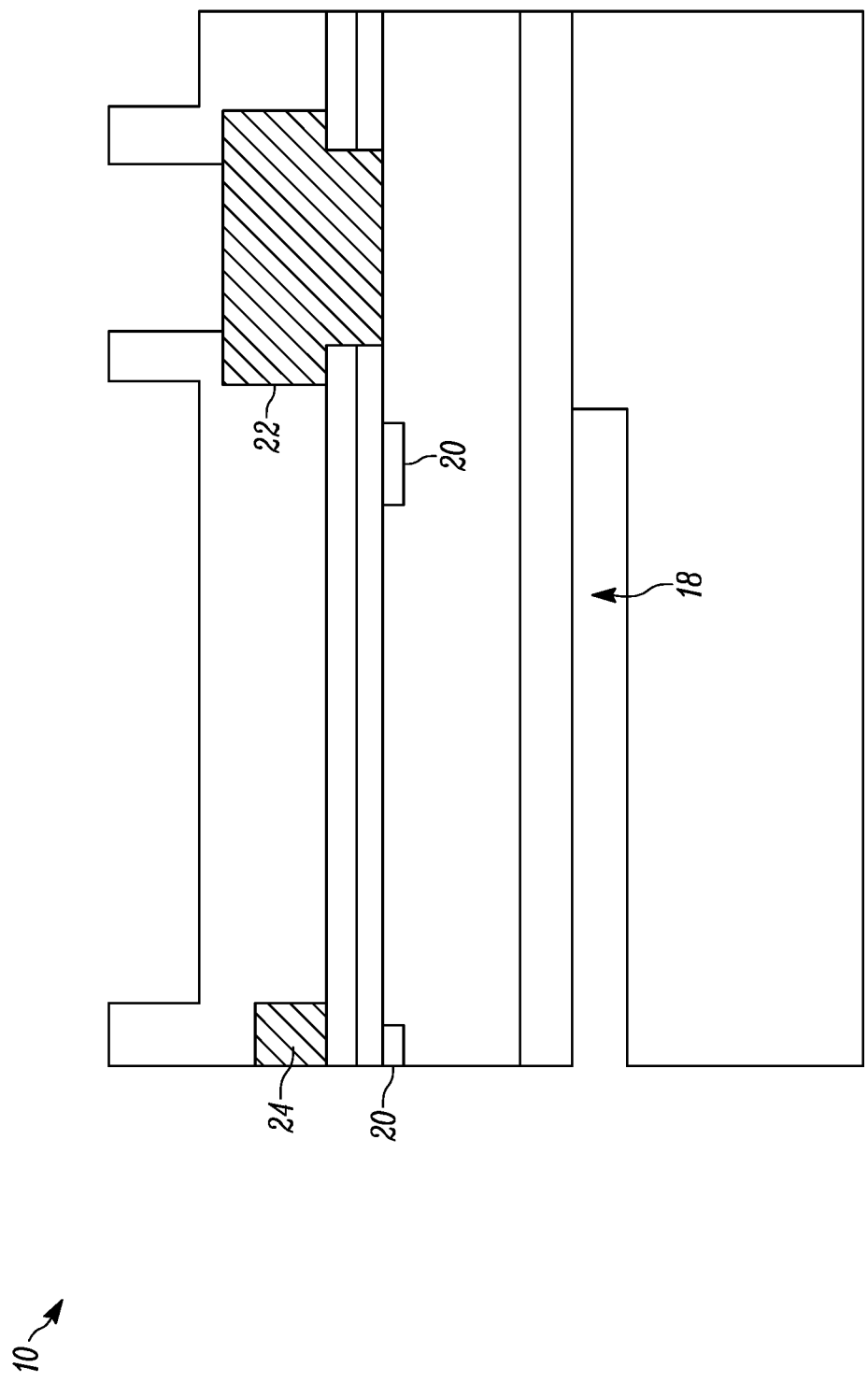
FIG. 5 is a schematic sectional view taken along line 5-5 of FIG. 3.
Figure 8A:
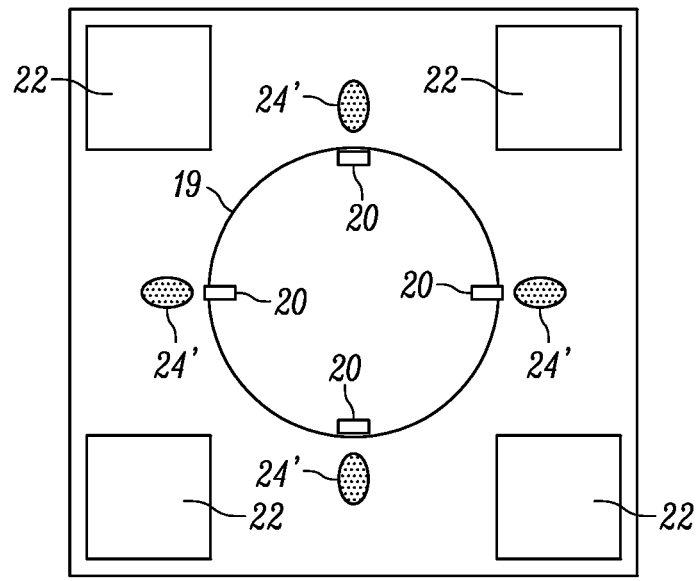
FIG. 8A is a top view of an alternate embodiment of the MEMS pressure sensing element in FIG. 4, configured with stress equalizers in an elliptical shape.
Figure 8B:
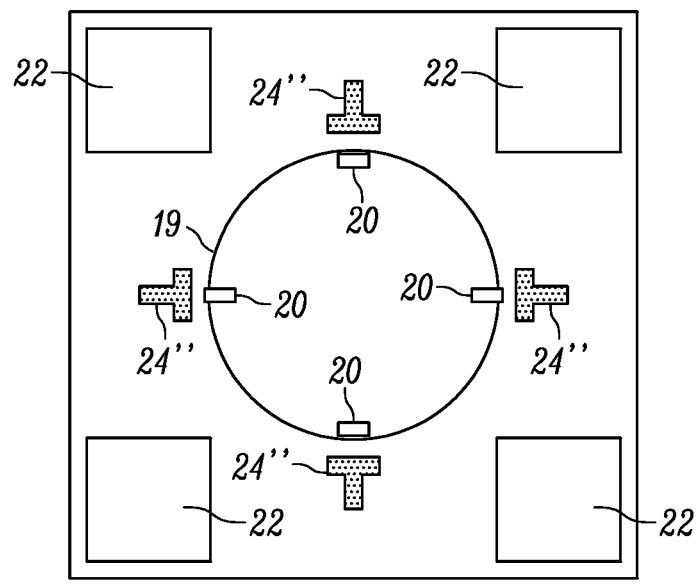
FIG. 8B is a top view of another alternate embodiment of the MEMS pressure sensing element, which shows stress equalizers in a T shape.

The size, shape and location of the stress equalizers 24 can be selected and optimized to reach zero thermal hysteresis. FIGS. 3 and 4 shows each stress equalizer 24 having a rectangular shape. FIG. 8A shows the stress equalizers 24' of elliptical shape and generally symmetrically located, with equalizer 24 being adjacent to a corresponding piezoresistor 20. FIG. 8B shows T-shaped stress equalizers 24". Other shapes of the stress equalizers 24 are also possible. Preferably, the stress equalizers 24 have no contact with silicon and are disposed over the LP Si3N4 passivation layer as shown in FIG. 5.

By using the stress equalizers 24 on the MEMS pressure sensing element 10, a smaller, low cost sensing element can be provided with no or little thermal hysteresis.

The description of the invention is merely exemplary in nature and, thus, variations that do not depart from the gist of the invention are intended to be within the scope of the invention. Such variations are not to be regarded as a departure from the spirit and scope of the invention.

What is claimed is:
1. A pressure sensing element, comprising:
   a supporting substrate including a cavity;
   a device layer bonded to the supporting substrate, with a diaphragm of the device layer covering the cavity in a sealed manner;
   a plurality of piezoresistors coupled to the diaphragm;
   a plurality of metal stress equalizers disposed on the device layer such that each stress equalizer is generally adjacent to, but separated from, a corresponding piezoresistor, and
   a plurality of metal bond pads disposed on the device layer,
   wherein the plurality of stress equalizers are constructed and arranged to reduce thermal hysteresis of the pressure sensing element caused by stress relaxation of the metal bond pads during a cooling and heating cycle of the pressure sensing element.

2. The pressure sensing element of claim 1, wherein the plurality of stress equalizers is constructed and arranged on the device layer so as to increase radial stresses on the plurality of piezoresistors and decrease tangential stresses on the plurality of piezoresistors during the cooling and heating cycle.

3. The pressure sensing element of claim 2, wherein four piezoresistors are provided on the diaphragm near a circumferential edge thereof and in a Wheatstone Bridge arrangement, and four corresponding stress equalizers are provided on the device layer outside the circumferential edge of the diaphragm.

4. The pressure sensing element of claim 3, wherein the four stress equalizers are arranged symmetrically on the device layer.

5. The pressure sensing element of claim 2, wherein the metal of each of the plurality of bond pads and of each of the plurality of stress equalizers is aluminum.

6. The pressure sensing element of claim 4, wherein each of the stress equalizers is in a rectangular shape.

7. The pressure sensing element of claim 4, wherein each of the stress equalizers is in at least one of an elliptical shape and a T shape.

8. The pressure sensing element of claim 1, wherein the plurality of stress equalizers is separated from the plurality of bond pads.

9. The pressure sensing element of claim 3, wherein two of the piezoresistors and two of the corresponding stress equalizers are disposed on a first axis and the other two piezoresistors and other two corresponding stress equalizers are disposed on a second axis that is perpendicular to the first axis.

10. A method of controlling thermal hysteresis of a pressure sensing element, the method comprising the steps of:

providing a pressure sensing element having a supporting substrate including a cavity; a device layer bonded to the supporting substrate, with a diaphragm of the device layer covering the cavity in a sealed manner; a plurality of piezoresistors coupled to the diaphragm; and a plurality of metal bond pads disposed on the device layer, and controlling thermal hysteresis of the pressure sensing element caused by stress relaxation of the metal bond pads during a heating and cooling cycle by increasing radial stress and decreasing tangential stress on each of the plurality of piezoresistors on the pressure sensing element.

11. The method of claim 10, wherein the step of controlling thermal hysteresis includes:

providing plurality of metal stress equalizers disposed on the device layer such that each stress equalizer is generally adjacent to, but separated from, a corresponding piezoresistor.

12. The method of claim 11, wherein four piezoresistors are provided on the diaphragm near a circumferential edge thereof and in a Wheatstone Bridge arrangement, and the method provides four corresponding stress equalizers on the device layer outside the circumferential edge of the diaphragm.

13. The method of claim 12, wherein the four stress equalizers are arranged symmetrically on the device layer.

14. The method of claim 11, wherein the metal of each of the plurality of bond pads and of each of the plurality of stress equalizers is aluminum.

15. The method of claim 11, wherein each of the stress equalizers is provided in a rectangular shape.

16. The method of claim 11, wherein each of the stress equalizers is provided in an elliptical shape.

17. The method of claim 11, wherein each of the stress equalizers is provided in a T shape.

18. The method of claim 11, wherein the plurality of stress equalizers is separated from the plurality of bond pads.

19. The method of claim 12, wherein two of the piezoresistors and two of the corresponding stress equalizers are disposed on a first axis and the other two piezoresistors and other two corresponding stress equalizers are disposed on a second axis that is perpendicular to the first axis.

* * * * *